US008811968B2

(12) United States Patent
Aiglstorfer (10) Patent No.: US 8,811,968 B2
(45) Date of Patent: Aug. 19, 2014

(54) SYSTEMS AND METHODS FOR EXECUTING AN APPLICATION ON A MOBILE DEVICE (75) Inventor: Rodney Aiglstorfer, Mill Valley, CA (US)

(73) Assignee: mFoundry, Inc., Sausalito, CA (US)

( * ) Notice: Subject to any disclaimer, the term of this patent is extended or adjusted under 35 U.S.C. 154(b) by 664 days.

(21) Appl. No.: 11/943,963

(22) Filed: Nov. 21, 2007

(65) Prior Publication Data

US 2009/0131035 A1 May 21, 2009

(51) Int. Cl.
*H04M 3/00* (2006.01)
*G06F 9/44* (2006.01)
*G06F 15/16* (2006.01)
*H04L 29/08* (2006.01)
*G06F 9/455* (2006.01)

(52) U.S. Cl.
CPC .......... *G06F 9/45504* (2013.01); *H04L 67/125* (2013.01)
USPC ............ 455/419; 455/418; 717/168; 709/229

(58) Field of Classification Search
USPC .......... 345/619; 709/201, 224–232; 717/149, 717/168–173; 370/465; 455/419
See application file for complete search history.

(56) References Cited

U.S. PATENT DOCUMENTS

| 5,752,036 | A * | 5/1998 | Nakamura et al. ............ 717/149 |
| 6,601,761 | B1 | 8/2003 | Katis |
| 7,263,698 | B2 * | 8/2007 | Wildhagen et al. ........... 717/170 |
| 7,693,796 | B2 | 4/2010 | Light et al. |
| 8,352,627 | B1 * | 1/2013 | Mackie ......................... 709/232 |
| 2001/0029178 | A1 | 10/2001 | Criss et al. |
| 2002/0174075 | A1 | 11/2002 | Mirlas et al. |
| 2003/0060896 | A9 | 3/2003 | Hulai et al. |
| 2003/0100301 | A1 | 5/2003 | Fujii |
| 2003/0212642 | A1 | 11/2003 | Weller et al. |
| 2003/0236867 | A1 | 12/2003 | Natsuno et al. |
| 2004/0143550 | A1 | 7/2004 | Creamer et al. |
| 2004/0210891 | A1 | 10/2004 | Kouznetsov et al. |
| 2004/0215700 | A1 | 10/2004 | Shenfield et al. |
| 2006/0256130 | A1 | 11/2006 | Gonzalez |
| 2007/0050840 | A1 | 3/2007 | Grandcolas et al. |
| 2007/0088952 | A1 | 4/2007 | Hewitt et al. |
| 2007/0094135 | A1 | 4/2007 | Moore et al. |
| 2007/0125840 | A1 | 6/2007 | Law et al. |
| 2007/0260556 | A1 | 11/2007 | Pousti |
| 2008/0003991 | A1 | 1/2008 | Sievers et al. |

(Continued)

FOREIGN PATENT DOCUMENTS

WO    WO 02/75527 A2    4/2004
WO    WO 2006/094117 A2    12/2007

OTHER PUBLICATIONS

Carol Power, "WAP Phones Set to Usher in Next Stage of Net Revolution," Irish Times, Jan. 21, 2000, p. 59 (accessed Jun. 19, 2010).

(Continued)

*Primary Examiner* — Nizar Sivji
(74) *Attorney, Agent, or Firm* — Finnegan, Henderson, Farabow, Garrett & Dunner LLP (57) ABSTRACT

The invention provides a method and system to execute applications on a mobile device. The applications may be compiled on a remote server and sent to the mobile device before execution. The applications may be updated by the remote server without interaction, by the mobile device user.

15 Claims, 5 Drawing Sheets

(56) References Cited

U.S. PATENT DOCUMENTS

2008/0319887 A1 12/2008 Pizzi et al.
2009/0070411 A1 3/2009 Chang et al.
2009/0089176 A1 4/2009 McCabe
2009/0119209 A1 5/2009 Sorensen et al.
2009/0132392 A1 5/2009 Davis et al.
2009/0234751 A1 9/2009 Chan et al.
2010/0088225 A1 4/2010 Forsberg
2010/0179907 A1 7/2010 Atkinson

OTHER PUBLICATIONS

Federal Financial Institutions Examination Council (FFIEC), "Authentication in an Internet Banking Environment," FFIEC Press Release, Oct. 12, 2005, available at http://www.ffiec.gov/press/pr101205.htm, entire document (accessed Jun. 25, 2007).

* cited by examiner

SYSTEMS AND METHODS FOR EXECUTING AN APPLICATION ON A MOBILE DEVICE

BACKGROUND OF THE INVENTION

1). Field of the Invention

This invention refers to systems and methods for executing an application on a mobile device.

2). Discussion of Related Art

Mobile devices including mobile phones (Cellular, Voice over Internet Protocol), personal digital assistants, and mobile email devices, smart phones, and mobile internet devices are commonly used throughout the world as communication devices. Mobile device users are more frequently using mobile devices for more complex applications, such as internet banking and social networking.

There are currently a myriad of mobile device platforms or operating systems, some of which include Java 2 Micro Edition (J2ME), Binary Runtime Environment for Wireless (BREW), Windows Mobile, Palm Operating System, Symbian Operating System, Wireless Internet Platform for Interoperability (WIPI), and the BlackBerry Operating System. Each operating system has different requirements for application software, therefore application developers are forced to write several different iterations of one application in order to satisfy the market place. Additionally the processing power and memory of most mobile devices is comparatively weak in terms of the requirements for compiling advanced mobile applications. Currently if an application needs to be installed on a mobile device, the processing power of the mobile device must be consumed in order to compile the application, resulting in a slow loading and slow performance. Furthermore, if an application needs updating, the entire application will need to be reinstalled and compiled, adding more time and complexity to the application.

SUMMARY OF THE INVENTION

The invention provides a computer implemented method to execute a bytecode by a mobile runtime environment, the method including receiving an uploaded source code at a remote server, compiling the source code into a bytecode on the remote server, sending a first runtime engine to a mobile device, wherein the first runtime engine communicates with an operating system of the mobile device, and sending the bytecode to the mobile device, wherein the bytecode is executable by the first runtime engine on the mobile device.

The computer implemented method may additionally include updating the bytecode.

The bytecode may not require user intervention for updating.

The computer implemented method may additionally include sending a second runtime engine to the second mobile device, wherein the second runtime engine communicates with a second operating system of the second mobile device, and wherein the operating system and second operating system have different application requirements for each respective runtime engine, and sending the bytecode to the second mobile device, wherein the bytecode is executable by the second runtime engine on the mobile device.

The source code may be at least partially constructed of machine executable code.

The machine executable code may be ECMAscript.

The method may additionally include receiving an uploaded image on the remote server, converting and down scaling the image file on the remote server, and sending the converted and down scaled image file to the mobile device.

The method may additionally include receiving an uploaded data file on the remote server, converting the data file into a binary format on the remote server, sending the binary format of the date file to the mobile device.

The invention, also provides a computer implemented method to execute a bytecode by a mobile runtime environment, the method including receiving an uploaded source code at a remote server, compiling the source code into a bytecode on the remote server, sending a plurality of runtime engines to a plurality of mobile devices, wherein each runtime engine communicates with a specific operating system of a mobile device, and wherein each specific operating system has different application requirements, and sending the bytecode to the plurality of mobile devices, wherein the bytecode is executable by each respective runtime engine on each respective mobile device.

The computer implemented method may additionally include updating each respective bytecode located on each respective mobile device.

No user intervention may be required for updating each respective bytecode.

The source code may be at least partially constructed of machine executable code.

The machine executable code may be ECMAscript.

The computer implemented method may additionally include receiving an uploaded image at the remote server, converting and down scaling the image file on the remote server, and sending the converted and down scaled image file to the plurality of mobile devices.

The computer implemented method may additionally include receiving an uploaded data file at the remote server, converting the data file into a binary format on the remote server, and sending the binary format of the date file to the plurality of mobile devices.

The invention also provides a computer implemented method to execute a bytecode by a mobile runtime environment, the method including storing a bytecode on a remote server, the bytecode previously compiled from a source code, receiving a request for the bytecode from a runtime engine on a mobile device, and sending the bytecode to the mobile device, wherein the bytecode is executable by the runtime engine on the mobile device.

The computer implemented method may additionally include receiving a second request for updated bytecode from the mobile device, and sending updated bytecode to the mobile device.

The invention also provides a computer implemented method to execute a bytecode by a mobile device runtime environment, the method including receiving a runtime engine at a mobile device from a remote server, wherein the runtime engine communicates with an operating system of the mobile device, and receiving a bytecode at the mobile device from the remote server, wherein the bytecode was compiled from source code on the remote server, and executing the bytecode by the runtime engine on the mobile device.

The computer implemented method may additionally include receiving updated bytecode.

Receiving updated bytecode may not require user intervention.

The mobile device may be a mobile telephone.

The computer implemented method may additionally include requesting the remote server for an updated bytecode.

Requesting the remote server for an updated bytecode may not require user intervention.

The invention also provides a system for executing a bytecode by a runtime environment, the system including a remote server for uploading a source code and compiling the source code into a bytecode, a mobile device for receiving the bytecode, and a runtime engine on the mobile device for executing the bytecode.

The system may additionally include a remote computer system for uploading and hosting the bytecode.

BRIEF DESCRIPTION OF THE DRAWINGS

The invention is further described by way of example(s) with reference to the accompanying drawings, wherein.

DETAILED DESCRIPTION OF THE INVENTION

Figure 1:
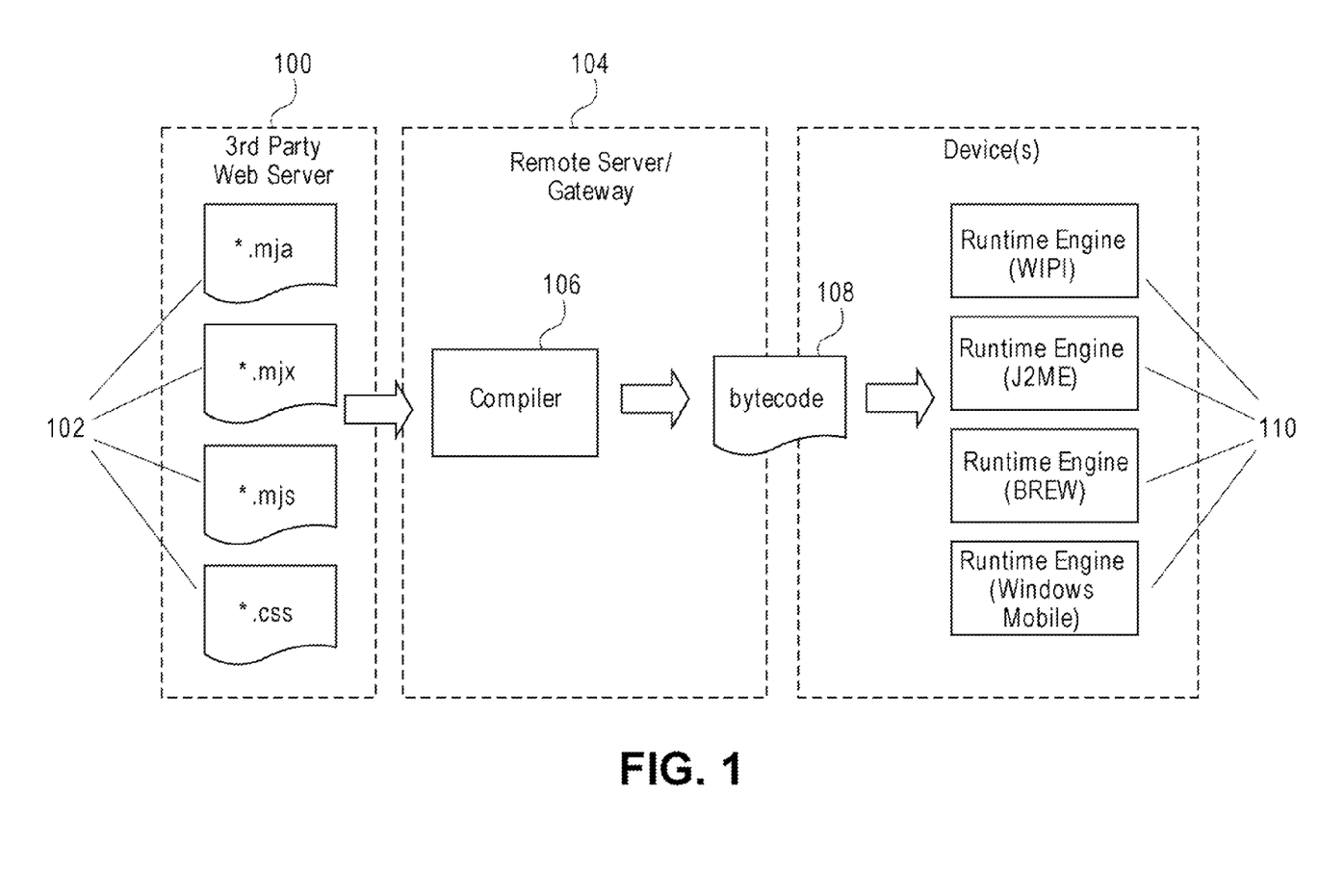
FIG. 1 is system level flow chart for executing an application on a mobile device

FIG. 1 of the accompanying drawings shows a flow chart, according to an embodiment of the invention. FIG. 1 illustrates a source file being compiled into bytecode which is sent to a mobile device. A third party computer or third party sever 100 hosts a source code 102. The source code 102 is written using an integrated developer environment (IDE), such as the open development platform Eclipse Integrated Development Environment, partially including both machine executable code and markup language, such as Extensible Markup Language (XML), Cascading Style Sheets (CSS), and European Computer Manufacturers Association Script (ECMAScript).

The source file is a set of instructions intended as an application that operates on a virtual machine, i.e. a runtime engine, on a mobile device. A runtime engine is software that creates a virtual environment, or runtime environment, on an operating system. The advantage to using software intended for a runtime engine, as opposed to writing instructions directly for the operating system, is that one set of software instructions may be implemented on a variety of operating systems.

There are currently a myriad of operating systems in the mobile world, e.g. BREW, WIPE, J2ME, Windows Mobile, etc., which all have very different software requirements for source code. Thus implementing a runtime engine that can operate on a myriad of operating systems allows software designers to write only one set of source code, rather than a separate source code for each operating system. A separate runtime engine is required for each operating system, however implementation of a separate runtime engine is less costly and time consuming than writing separate source code, because a runtime engine is often created by a different entity and preexists prior to the source code.

The source file is uploaded to a remote server 104. At the remote server 104 the source code 102 is compiled once and stored on the server. The source code 102 is compiled into bytecode 108 by a compiler 106 residing on the remote server 104. Bytecode is a binary representation of executable software designed to be executed by a runtime engine. The runtime engine cannot execute the source code directly, because source code is a representation of instructions that are readable by a human, i.e. one skilled in the art of software programming, and not readable by a runtime engine.

The source code 102 may be compiled at the request of a runtime on a mobile device. Alternatively, the source code 102 may have teen previously compiled, and stored on the server. The remote server 104 may also store different runtime engines which are intended for use on different mobile operating systems. The remote server 104 also operates as a communications gateway because it can send the bytecode and runtime engines over a cellular communications network or alternatively to a data network (a private network or the Internet), or combination thereof.

The bytecode 108 is sent to a mobile device 110, typically in response to a request from the runtime engine on the mobile device 110. A runtime engine may first be sent to a mobile device 110, if the mobile device 100 does not already have the runtime engine residing on it. The bytecode 108 may be stored on the mobile device 110 and used for final execution by the runtime engine on the mobile device 110.

The runtime engine has relatively little work to perform executing the bytecode as the compiler 106 on the server has done the majority of the work of parsing and optimizing the source code. This method is particularly advantageous for mobile devices. Mobile device are constrained technologically, because of size and cost considerations, to have relatively weak processing power. Therefore, if the compilation of the source code occurred on the mobile device, the final execution of the source code would require more time and processing power.

The same bytecode 108 may be sent to a plurality of mobile devices 110 (e.g. a first mobile device, a second mobile device, a third mobile device, etc.) without any alteration to the bytecode, where each mobile device has a different operating system. The ability to upload the same bytecode 108 to a plurality of devices 110 allows for a single uploaded source code 102 and subsequently compiled bytecode 108 to be used on a myriad of operating systems.

It is important to note that the methods described herein offer a great advantage in terms of resourcing processing power and compilation time. The source code 102 for an application on a mobile device 110 does not require a great deal of processing power or time on a server, because a mobile device application is rather simplistic compared to a server processing system as opposed to being very demanding to a mobile device 110 processing system. The processing power of the remote server 104 is on several magnitudes greater than the mobile device 110, thus compiling the source code 102 (of a mobile device application) on a remote server 104 occurs several times more rapidly than compiling on a mobile device 110. Thus, even considering the downloading and receiving of a bytecode over a network to a mobile device 110 and the demands of the remote server 104 to perhaps compile a plurality of application simultaneously, compiling source code 102 into bytecode 108 on a remote server 104 is still much faster than compiling source code 102 on a mobile device 110.

The remote server 104 also allows updating the bytecode 108 as needed. Updating may be performed without any user interaction on the mobile device 110, and thus updating is performed seamlessly and unknowingly to the user. Updating bytecode 108 is particularly advantageous for application which requires frequent updates, because source code compilation is performed on the remote server 104 saving processing time on the mobile device. Updating an application may thus be invisible to the user because the runtime engine would already be installed on a mobile device 110 requiring no new installation time, and the updated bytecode 108 may be downloaded when the application is not in use. For example, when a mobile device 110 logs on to a data network or is alternatively dormant, the runtime engine or application may automatically and periodically check for updates and download updated bytecode 108 as necessary.

File Conversion

Figure 2:
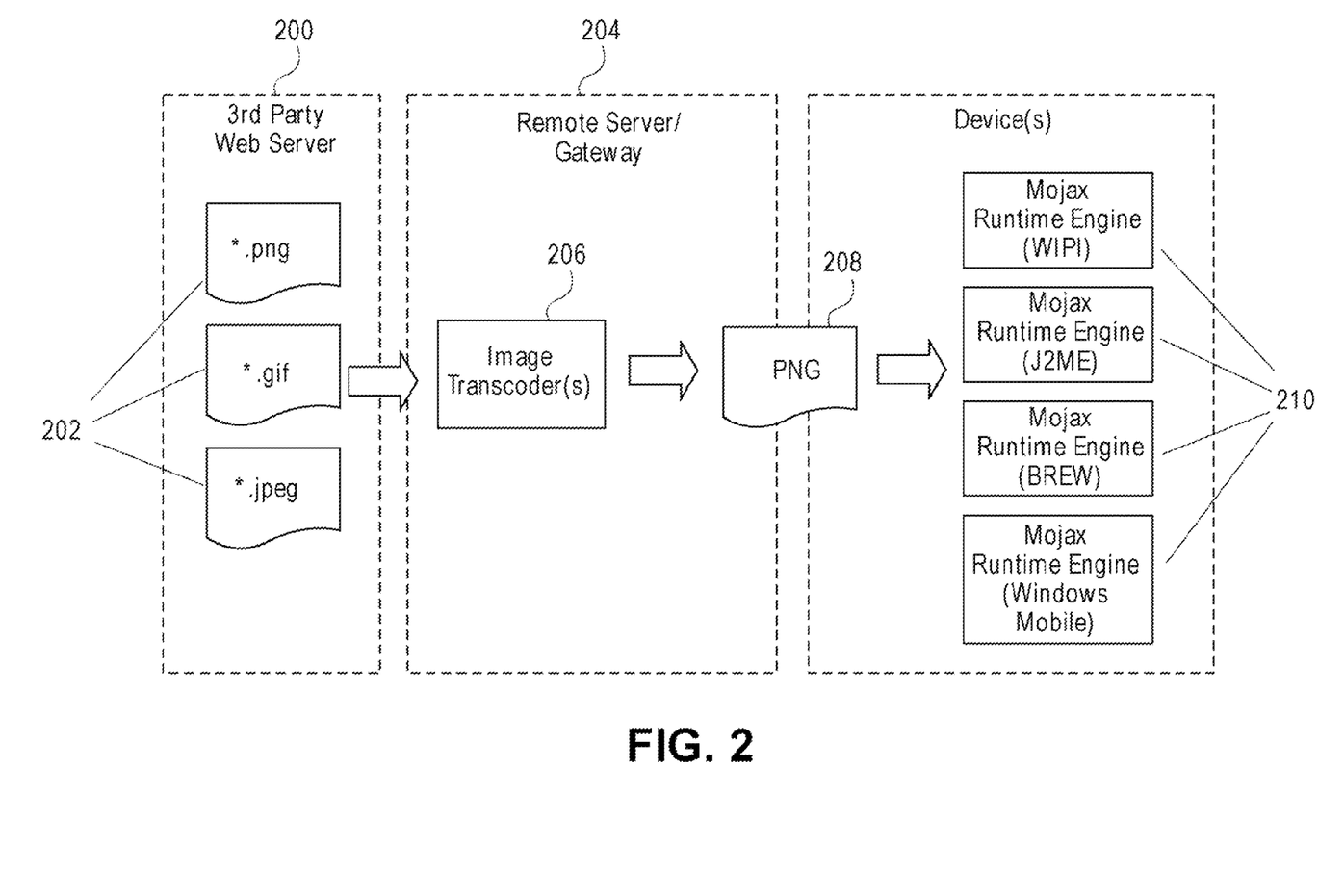
FIG. 2 is system level flow chart for transcoding images for an application on a mobile device.

FIG. 2 shows a flow chart which illustrates an image file being converted and down scaled, and sent to a mobile device. In addition to compiling source code into byte code, the server may also convert image files. A third party computer or third party server 200 or hosts image files, such as Joint Photographic Experts Group (JPEG) files and Graphics Interchange Format (GIF) image files 202. The image files 202 are uploaded to the remote server 204 and converted and scaled as necessary by an image transcoder 206 residing on the remote server 204. The image transcoder 206 converts large image files into a format compatible with a mobile device. The image transcoder 206 simultaneously coverts the image file 202 as the source code 102 is being compiled. The converted image 208 is sent a mobile device 210 on the same date stream as the bytecode 108 for use in the same application.

Figure 3:
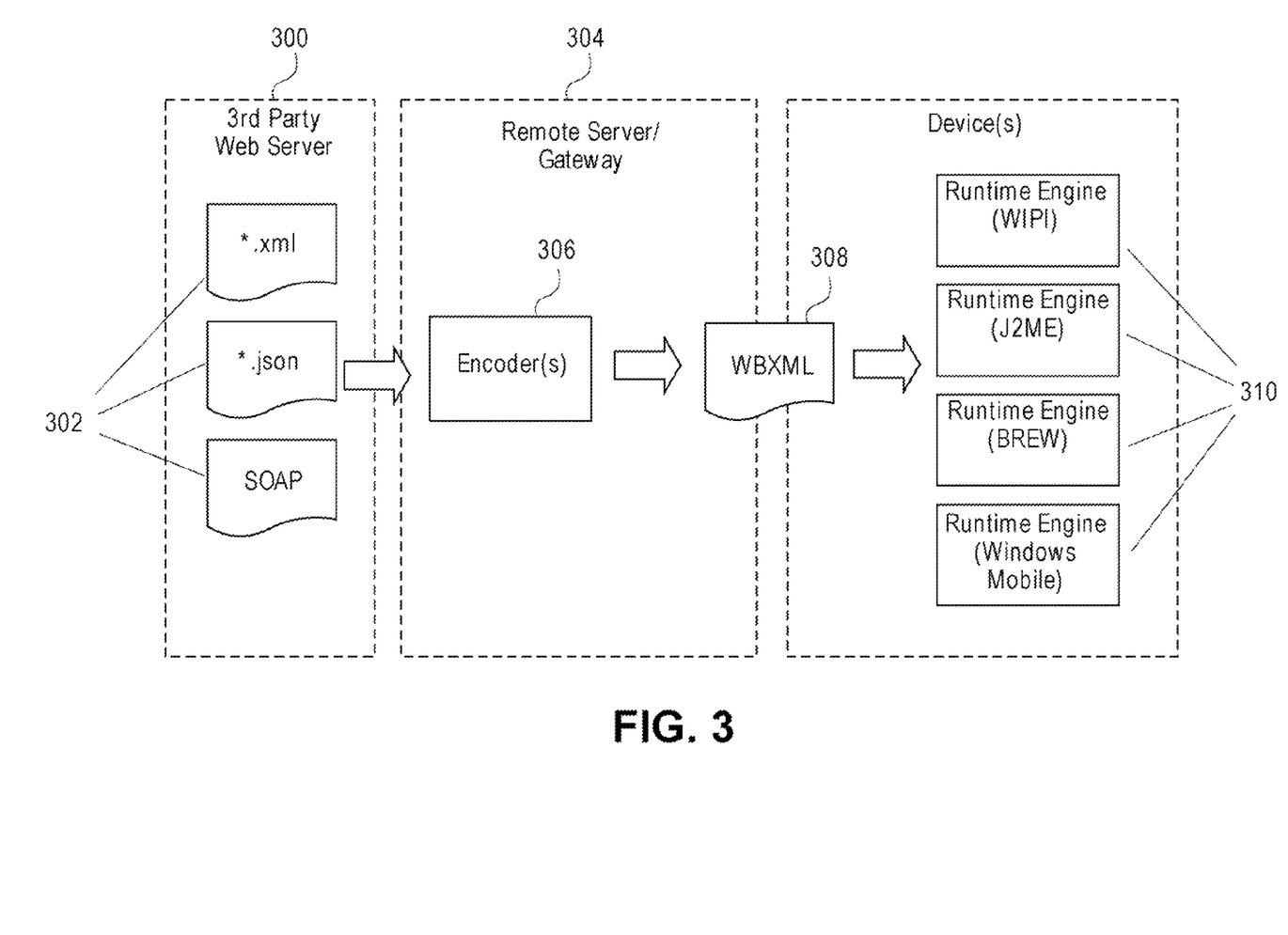
FIG. 3 is system level flow chart for encoding a data file for an application on a mobile device.

FIG. 3 shows a flow chart which illustrates a data file, for example an XML file, being converted a binary data file, for example WAP Binary XML (WBXML) file, and sent to a mobile device. Data files written in markup languages are commonly used for Internet applications. XML is a language which has the purpose of presenting data in a structured manner such that if may be useable between different systems, especially over the Internet. XML files should be understood to be structured data files, and not instructions or machine executable code. Data files 302 are hosted by a third party server or third party computer 300. A remote server 304 includes an encoder 306 which converts the data file 302 into a binary data file 308, such as WBXML file. WBXML files are binary representations of XML files and are therefore smaller and more easily transmittable over a mobile network. The encoder 306 residing on the remote server 304 converts the data file 302 while the source code 102 is being compiled. The data file 302 is sent to a mobile device 310 on the same data stream as the bytecode 108 for use in the same application.

Figure 4:
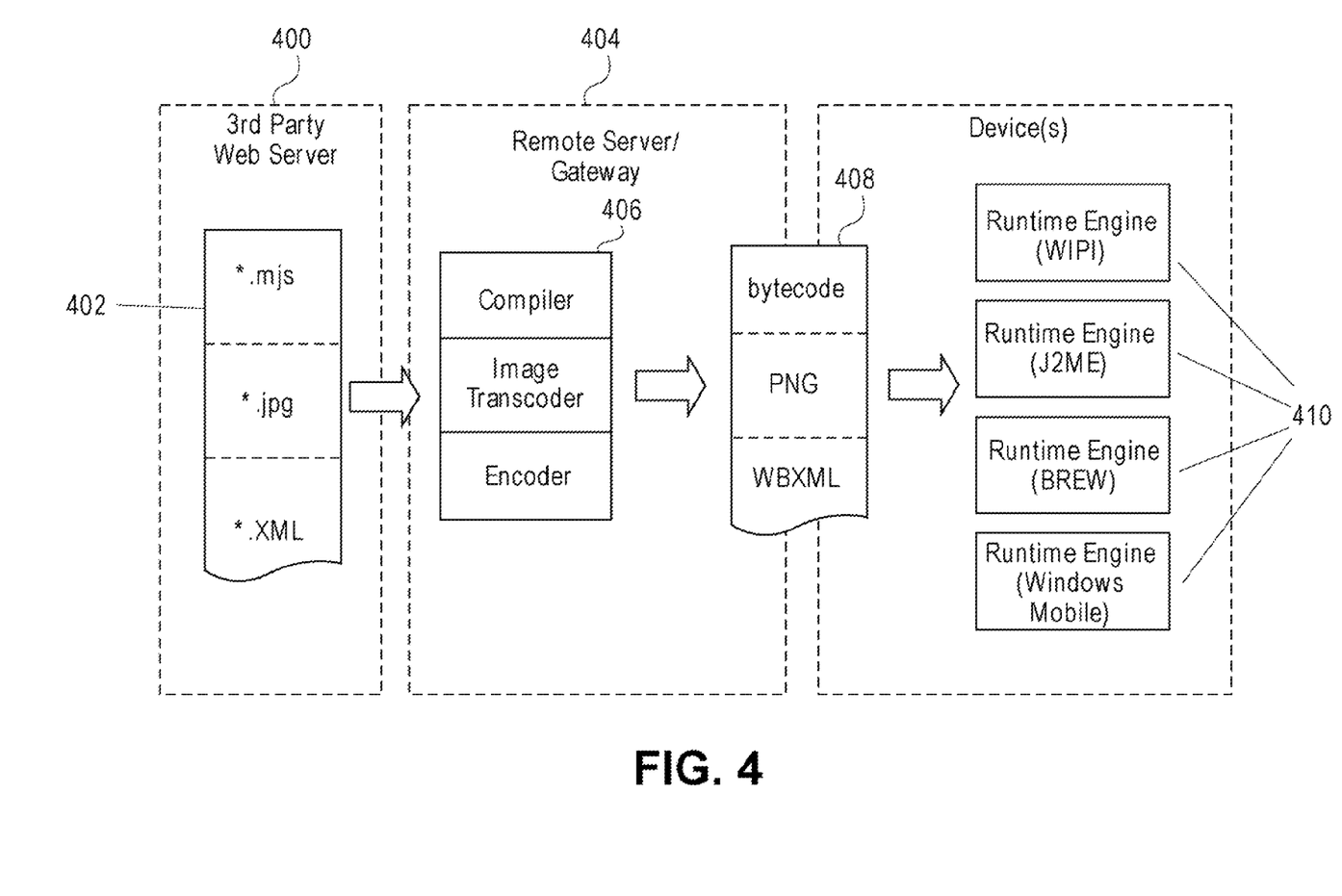
FIG. 4 is a system level flow chart for executing an application on a mobile device, transcoding images for an application on a mobile device, and encoding a data file for an application on a mobile device.

FIG. 4 shows a chart illustrating the integration of the methods shown in FIGS. 1-3. Typically a third party server 400 will host a file 402 which will have a combination of source code, image files, and data files, depending on the properties of the final application. For example some applications will not require the file 400 to include images. The file 400 is uploaded to a remote server 404 that will in a parallel or operation compile source code, transcode image files, and encode data files. Alternatively the remote server 404 may perform operations in series. The output file 408 containing the bytecode, transcoded image files, and encoded data files will then be sent to a mobile device 410. The output file 408 is then executed on the mobile device 410 as a useful application.

Exemplary Data Processing System

Figure 5:
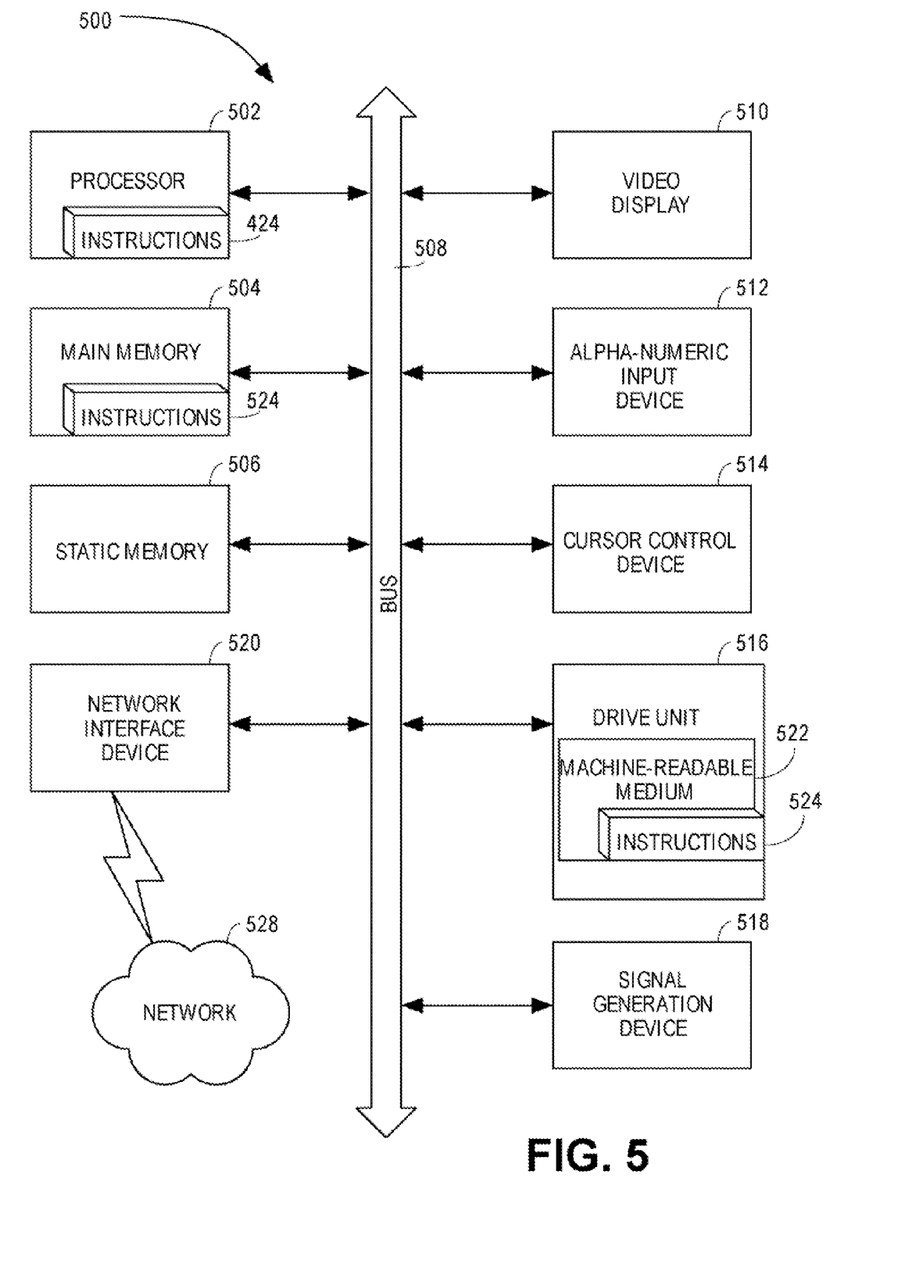
FIG. 5 is a block diagram of an exemplary computer system.

FIG. 5 of the accompanying drawings illustrates an exemplary computer system 500, also known as a data processing system that can for example form the remote server of FIG. 1, 2, or 3. The operations, processes, modules, methods. and systems described and shown in the accompanying figures of this disclosure are intended to operate on one or more exemplary computer systems 500 as sets of instructions (e.g. software), also known as computer implemented methods. The exemplary computer system 500 is generally representative of personal or client computers, mobile devices (e.g. mobile cellular device, PDA, satellite phone, mobile VoIP device), and servers. A mobile device will also have an antenna and a microchip, for running a protocol for the radio frequency reception and transmission of communications signals. The exemplary computer system 500 includes at least one processor 502 (e.g., a Central Processing Unit (CPU), a Graphics Processing Unit (GPU) or both), a main memory 504 (e.g., Read Only Memory (ROM), flash memory, Dynamic Random Access Memory (DRAM) such as Synchronous DRAM (SDRAM) or Rambus DRAM (RDRAM), etc.), and a static memory 506 (e.g., flash memory, Static Random Access Memory (SRAM), etc.), which communicate with each other via a bus 508.

The computer system 500 may further include a video display 510 (e.g. Liquid Crystal Display (LCD) or a Cathode Ray Tube (CRT) or a touch screen). The computer system 500 also includes an alphanumeric input device 512 (e.g., a keyboard, phone pad, touch screen), a cursor control device 514 (e.g., a mouse), a disk drive unit 516, a signal generation device 518 (e.g. a speaker), and a network interface device 520. The network interface device will at least be wireless in case of a mobile device, for communicating to a wireless network (e.g. cellular, VoIP). If the computer system 500 functions as a server, the video display 510, input device 512, signal generation device 518, and cursor control device 514 may not be needed. A mobile device will include one or more signal input devices (e.g. a microphone, camera, fingerprint scanner) which is not shown.

The disk drive unit 516 includes a machine-readable medium 522 on which is stored one or more sets of instructions 524 (e.g. software) embodying any one or more methodologies or functions. The software may also reside, completely or at least partially, within the main memory 504 and/or within the processor 502 during execution thereof by the computer system 500, the main memory 504, and the processor 502 also constituting machine-readable media.

The software may further be transmitted or received over a network 528 via the network interface device 520.

While the machine-readable medium 524 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform one or more methodologies. It should be known that the processes, methods, and modules disclosed herein are intended to be contained as instructions on a machine read able medium.

While certain exemplary embodiments have teen described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer implemented method for updating an application to a mobile device comprising:

compiling, by a server computer system remote from a first mobile device and a second mobile device, source code to generate an application comprising operating system independent bytecode capable of being executed by a first runtime engine capable of communicating with a first operating system of the first mobile device and a second runtime engine capable of communicating with a second operating system of the second mobile device; and, communicating, by the server computer system, to the first mobile device or the second mobile device, an update to the application while the application is not in use by a user, wherein the update to the application comprises operating system independent bytecode;

wherein the first operating system and the second operating system are different, and wherein the server computer system is capable of compiling the source code faster than the first mobile device or the second mobile device.

2. The computer implemented method of claim 1, further comprising:

compiling, by the server, updated source code to generate the update to the application.

3. The computer implemented method of claim 1 wherein communicating the update to the application is done seamlessly and unknowingly to a user.

4. The computer implemented method of claim 1 wherein the first runtime engine or the second runtime engine are is configured to periodically check for the update to the application.

5. The computer implemented method of claim 1 wherein the first runtime engine or the second runtime engine are configured to check for the update to the application when the first mobile device or the second mobile device logs on to a data network.

6. A system for updating an application to a mobile device, the system comprising:

one or more memory devices storing software instructions; and one or more processors configured to execute the software instructions to;

compile source code to generate an application comprising operating system independent bytecode capable of being executed by a first runtime engine capable of communicating with a first operating system of the first mobile device and a second runtime engine capable of communicating with a second operating system of the second mobile device; and, communicate to the first mobile device or the second mobile device an update to the application while the application is not in use by a user, wherein the update to the application comprises operating system independent byte code;

wherein the first operating system and the second operating system are different, and wherein the system is capable of compiling the source code faster than the first mobile device or the second mobile device.

7. The system of claim 6, wherein the one or more processors are further configured to execute the software instructions to:

compile updated source code to generate the update to the application.

8. The system of claim 6, wherein communicating the update to the application is done seamlessly and unknowingly to a user.

9. The system of claim 6 wherein the first runtime engine or the second runtime engine are configured to periodically check for the update to the application.

10. The system of claim 6 wherein the first runtime engine or the second runtime engine are configured to check for the update to the application when the first mobile device or the second mobile device logs on to a data network.

11. A non-transitory computer readable medium storing instructions that, when executed by one or more processors, causes the one or more processors to perform operations comprising:

compiling source code to generate an application comprising operating system independent bytecode capable of being executed by a first runtime engine capable of communicating with a first operating system of the first mobile device and a second runtime engine capable of communicating with a second operating system of the second mobile device; and, communicating to the first mobile device or the second mobile device an update to the application while the application is not in use by a user, wherein the update to the application comprises operating system independent byte code;

wherein the first operating system and the second operating system are different, and wherein the one or more processors are capable of compiling the source code faster than the first mobile device or the second mobile device.

12. The non-transitory computer readable medium of claim 11, wherein the one or more processors perform operations further comprising:

compiling updated source code to generate the update to the application.

13. The non-transitory computer readable medium of claim 11, wherein communicating the update to the application is done seamlessly and unknowingly to a user.

14. The non-transitory computer readable medium of claim 11 wherein the first runtime engine or the second runtime engine are configured to periodically check for the update to the application.

15. The non-transitory computer readable medium of claim 11 wherein the first runtime engine or the second runtime engine are configured to check for the update to the application when the first mobile device or the second mobile device logs on to a data network.

* * * * *